United States Patent [19]
Patel et al.

[11] Patent Number: 5,950,991
[45] Date of Patent: Sep. 14, 1999

[54] FORCE TRANSMITTING APPARATUS

[75] Inventors: Kirit R. Patel, North Royalton; Edward J. Lunder, Strongsville, both of Ohio

[73] Assignee: Eaton Corporation, Cleveland, Ohio

[21] Appl. No.: 08/852,094

[22] Filed: May 6, 1997

[51] Int. Cl.[6] .................................................... B66D 5/26
[52] U.S. Cl. .................................. 254/379; 188/71.5
[58] Field of Search ................................. 254/378, 379; 188/71.5

[56] References Cited

U.S. PATENT DOCUMENTS

| | | | |
|---|---|---|---|
| 2,574,378 | 11/1951 | Crookston | 254/379 |
| 2,925,889 | 2/1960 | Albright | 188/71.5 |
| 4,207,968 | 6/1980 | Chamberlain | 188/71.5 |
| 4,434,971 | 3/1984 | Cordrey | 254/379 |
| 4,542,944 | 9/1985 | Lyons . | |
| 5,342,020 | 8/1994 | Stone | 254/378 |
| 5,383,544 | 1/1995 | Patel . | |
| 5,669,469 | 9/1997 | Ericson et al. | 188/71.5 |
| 5,709,285 | 1/1998 | Sokalski et al. | 254/379 |
| 5,765,673 | 6/1998 | Nishiyama et al. | 188/71.5 |

*Primary Examiner*—Katherine Matecki
*Attorney, Agent, or Firm*—Tarolli, Sundheim, Covell Tummino & Szabo

[57] ABSTRACT

An improved force transmitting apparatus for transmitting force between first and second members includes a plurality of force transmitting assemblies. The force transmitting assemblies are operable between engaged conditions in which the first force transmitting apparatus is effective to transmit force and disengaged conditions in which the force transmitting apparatus is ineffective to transmit force. A controller operates the force transmitting assemblies between the disengaged and engaged conditions as a function of a load applied to the apparatus. The improved force transmitting apparatus is useful as a brake in a drilling system having a draw string connectable with pipe. The force transmitting assemblies are connected with a drum of a winch connected to the draw string.

19 Claims, 3 Drawing Sheets

FORCE TRANSMITTING APPARATUS

BACKGROUND OF THE INVENTION

The present invention relates to a new and improved force transmitting apparatus and method which are used to control a variable load.

The force transmitting apparatus is particularly useful as a brake in a drilling system having a draw string which is subjected to large tension forces by pipe connected with a drill bit. The force transmitting apparatus retards rotation of a winch drum connected with the draw string to control the tension in the draw string. Controlling tension in the draw string enables the force applied against the drill bit by the pipe to be controlled.

It has been suggested that a brake for a winch drum in a drilling system include seven force transmitting discs to provide a large braking force to offset large tension forces in the draw string. Control fluid pressure is supplied to the brake to control operation of the brake. The control fluid pressure supplied to the brake is varied to vary the tension in the draw string. The large number of force transmitting discs in the brake causes the tension in the draw string to change significantly with a very small change in control fluid pressure.

SUMMARY OF THE INVENTION

An improved apparatus for transmitting force between first and second members includes a plurality of force transmitting assemblies. A control system operates the force transmitting assemblies between disengaged and engaged conditions as a function of variations in a load applied to the apparatus.

The apparatus may be used in a drilling system having a draw string connected with pipe. The force transmitting assemblies are connected with a rotatable drum of a winch which is connected with the draw string. A sensor provides a signal which is a function of the load on the draw string. The control system operates the force transmitting assemblies between disengaged and engaged conditions and modulates force transmitted by the force transmitting assemblies as a function of the signal from the sensor. The control system can effect operation of various combinations of force transmitting assemblies to engaged conditions and modulate the force transmitted by the force transmitting assemblies as the load on the draw string varies.

BRIEF DESCRIPTION OF THE DRAWINGS

The foregoing and other features of the present invention will become more apparent upon a consideration of the following description taken in connection with the accompanying drawings, wherein.

DESCRIPTION OF ONE SPECIFIC PREFERRED EMBODIMENT OF THE INVENTION

General Description

Figure 1:
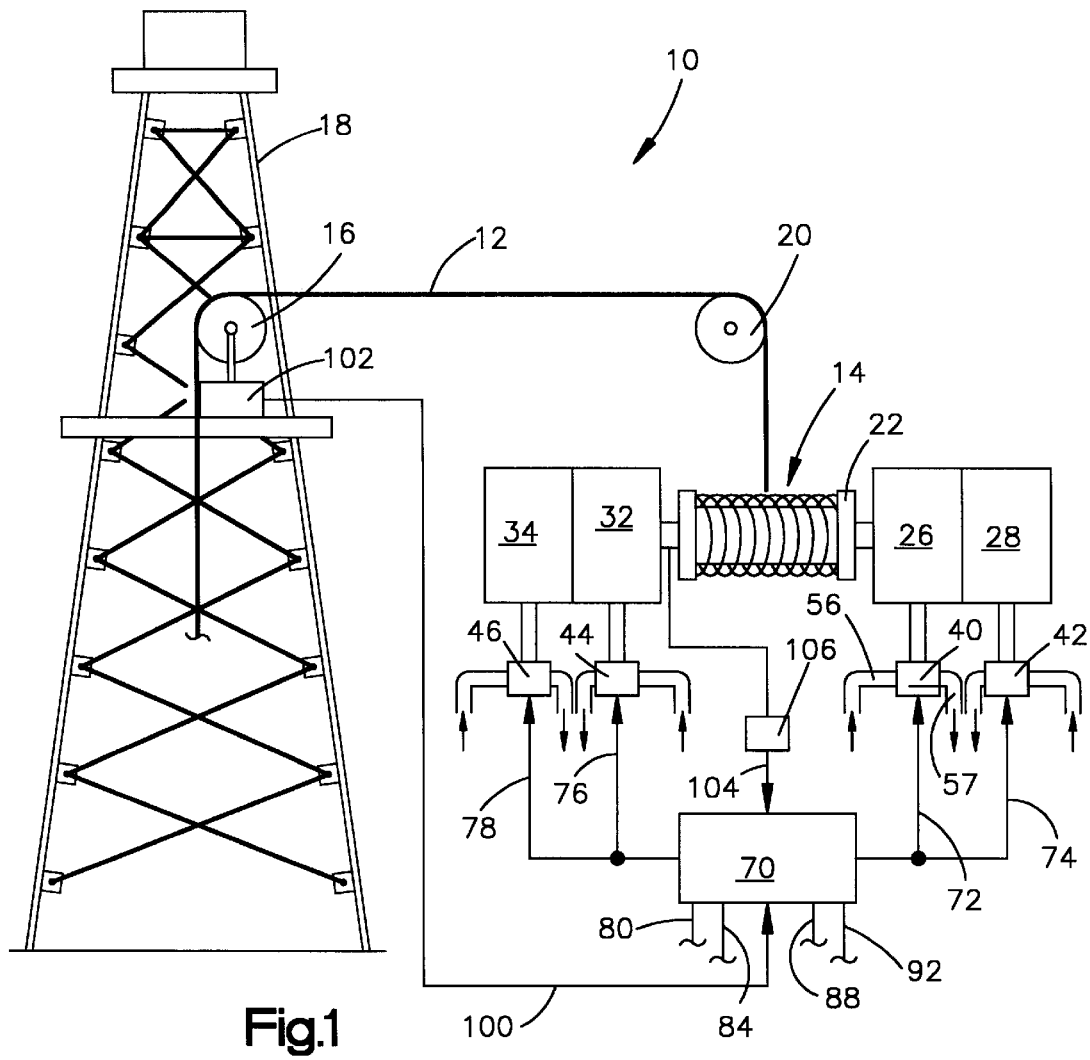
FIG. 1 is a schematic view illustrating a drilling system having a plurality of force transmitting assemblies or brakes to control tension on a draw string.

A drilling system 10 (FIG. 1) includes a draw string 12 having one end connected with a winch 14 and another end connected with pipe (not shown). The draw string 12 extends around a pulley 16 mounted on a derrick 18 and a pulley 20. The draw string 12 is wrapped around a rotatable drum 22 of the winch 14.

Force transmitting assemblies or brakes 26, 28, 32, and 34 are operable between engaged conditions in which the brakes retard rotation of the winch drum 22 and disengaged conditions in which the brakes are ineffective to retard rotation of the winch drum. The brakes 26 and 28 are connected to one axial end of the winch drum 22. The brakes 32 and 34 are connected to the opposite axial end of the winch drum 22.

Known fluid pressure control systems 40, 42, 44, and 46 (FIG. 1) are operable to vary the fluid pressure supplied to the brakes 26, 28, 32, and 34. The fluid pressure control system 40 controls the pressure of a fluid, such as compressed air, supplied to the brake 26 to effect operation of the brake 26 between the engaged and disengaged conditions. When the brake 26 is in the engaged condition, the fluid pressure control system 40 is operable to vary the fluid pressure conducted to the brake 26 to modulate the force transmitted by the brake. The fluid pressure control systems 42, 44 and 46 control the pressure of fluid, such as compressed air, supplied to the brakes 28, 32, and 34 in the same manner as in which the control system 40 controls the pressure supplied to the brake 26.

The fluid pressure control system 40 receives fluid from a source of fluid, such as an air compressor (not shown), through an inlet conduit 56. Fluid pressure is exhausted from the fluid pressure control system 40 through an outlet conduit 57. The fluid pressure control systems 42, 44, and 46 are supplied with and vent fluid pressure in the same manner as the fluid pressure control system 40.

The fluid pressure control systems 40, 42, 44, and 46 are operated by a controller 70 (FIG. 1) to control the fluid pressure supplied to the brakes 26, 28, 32, and 34. The controller 70 sends a signal through an electrical line 72 to the fluid pressure control system 40 to control operation of the brake 26. The controller 70 also sends signals through electrical lines 74, 76 and 78 to the fluid pressure control systems 42, 44 and 46 to control operation of the brakes 28, 32 and 34.

The controller 70 receives a signal, which varies as a function of variations the load on the draw string 12, through an electrical line 100 from a load cell 102 mounted on the derrick 18. The pulley 16, around which the draw string 12 passes, is mounted on the load cell 102. The controller 70 receives a signal, which varies as a function of variations in the speed of rotation of the drum 22, through line 104 from a tachometer 106. The tachometer 106 is connected with the drum 22.

In accordance with a feature of the present invention, the controller 70 operates the fluid pressure control systems 40–46 to effect operation of the brakes 26–34 as a function of the load on the draw string 12 and the speed of rotation of the drum 22. As the load on the draw string 12 increases or the speed of rotation of the drum 22 increases, the controller 70 effects operation of various combinations of the brakes 26–34 from disengaged conditions to engaged conditions to retard rotation of the drum 22. The controller 70 has a look up table which tells the controller which of the brakes 26–34 to operate to the engaged condition based on the load on the draw string 12 and the speed of rotation of the drum 22. In addition, the data stored in the controller 70 enables the controller to vary the fluid pressure conducted to one or more of the brakes 26–34 to modulate the force transmitted between the brakes and the drum 22 with variations in the load on the draw string 12.

The brakes 26 and 32 have the same force transmitting capacity. The brakes 28 and 34 have the same force transmitting capacity. The force transmitting capacity of the brakes 28 and 34 is greater than the force transmitting capacity of the brakes 26 and 32. The brakes 26–32 could all have the same force transmitting capacity or the brakes could all have different force transmitting capacities.

An entire control fluid pressure range is available to effect operation of each of the brakes 26, 28, 32 and 34 between the disengaged condition and an engaged condition transmitting a maximum braking force to the winch drum 22. Since there are four separate brakes 26, 28, 32 and 34, a relatively large change in control fluid pressure may be utilized to effect a relatively small change in the braking force transmitted to the winch drum 22. If the brakes 26 and 28 were replaced by a single large brake having the combined capacity of the brakes 26 and 28, a relatively small change in control fluid pressure would effect a relatively large change in braking force transmitted to the winch drum 22.

Fluid Pressure Control System

Each of the fluid control systems 40, 42, 44, and 46 is identical and has a known construction, therefore, only the fluid pressure control system 40 will be described in detail. The fluid pressure control system 40 varies the fluid pressure supplied to the brake 26 in accordance with commands from the controller 70.

Figure 2:
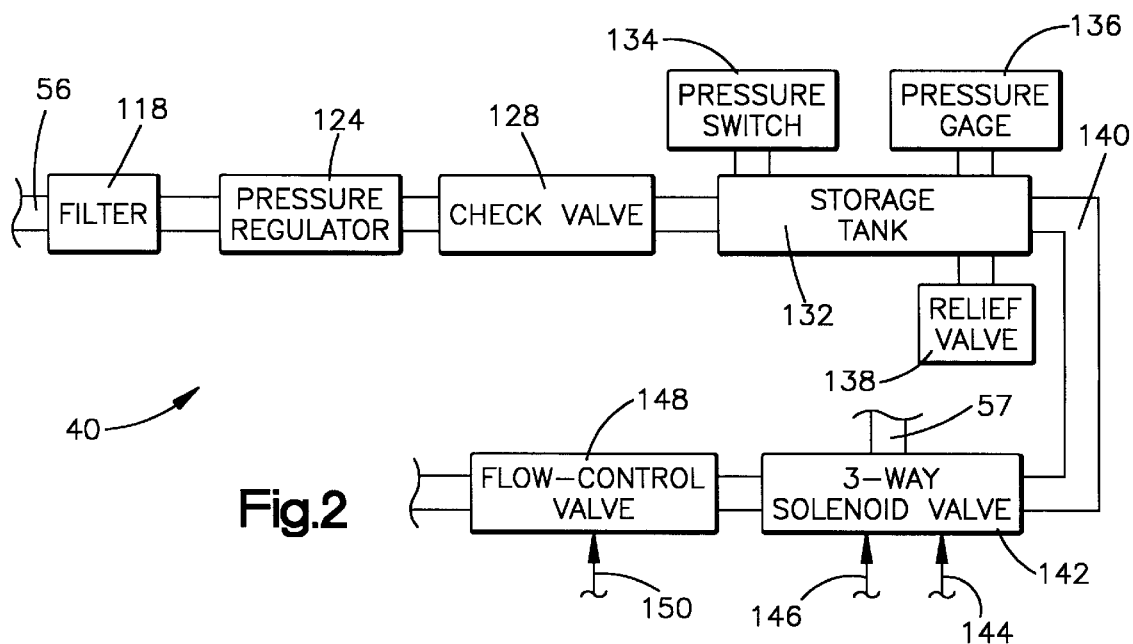
FIG. 2 is a schematic view of a fluid pressure control system which controls fluid pressure supplied to one of the force transmitting assemblies or brakes in the apparatus of FIG. 1.

The fluid pressure control system 40 (FIG. 2) includes a filter 118 which receives pressurized fluid, preferably air, from the compressor (not shown) through the inlet conduit 56. The filter 118 removes contaminants from the fluid. The filtered fluid is conducted to a pressure regulator 124 which establishes a maximum fluid pressure that can be supplied to the brake 26.

The fluid is conducted from the pressure regulator 124 to a check valve 128 (FIG. 2) and a storage tank 132. A pressure switch 134, a pressure gauge 136, and a relief valve 138 are connected with the storage tank 132. The pressure switch 134 ensures that sufficient pressure is available to operate the brake 26.

A conduit 140 conducts fluid from the storage tank 132 to a three way solenoid valve 142. The solenoid valve 142 modulates fluid pressure conducted to and from the brake 26. The solenoid valve 142 is spring biased to an initial position blocking fluid flow to and from the brake 26.

The solenoid valve 142 receives a signal from the controller 70 through lead 144, which is part of the electrical line 72 (FIG. 1), to effect operation of the solenoid valve to a position in which fluid pressure is conducted to the brake 26. The fluid pressure supplied to the brake 26 effects operation of the brake 26 to a disengaged condition against the influence of biasing springs in the brake.

The solenoid valve 142 (FIG. 2) receives a signal from the controller 70 through lead 146, which is part of the line 72 (FIG. 1), to effect operation of the solenoid valve to a position in which fluid is exhausted from the brake 26. The fluid pressure exhausted from the brake 26 through the outlet conduit 57 (FIG. 2) is varied by varying the position of the valve spool (not shown) in the solenoid valve 142 in response to the signal through the lead 146.

A relatively small reduction in the fluid pressure conducted to the brake 26, in response to exhausting a relatively small amount of fluid through the solenoid valve 142 (FIG. 2), is effective to enable springs in the brake 26 to operate the brake from a disengaged condition to an engaged condition. When this occurs, the brake 26 is effective to transmit a relatively small force to retard rotation of the winch drum 22. To increase the braking force transmitted to the winch drum 22 through the brake 26, the fluid pressure conducted to the brake through the solenoid valve 142 is further reduced. This reduction in fluid pressure is achieved by moving a valve spool (not shown) in the solenoid valve 142 to further exhaust fluid through the outlet conduit 57. As the fluid pressure conducted to the brake 26 is reduced, the braking force transmitted through brake to the winch drum 22 is increased.

A flow control valve 148 (FIG. 2) receives fluid from the solenoid valve 142 and controls the rate of flow of fluid to and from the brake 26. The flow control valve 148 receives a signal from the controller 70 through lead 150, which is part of the line 72 (FIG. 1).

The fluid pressure control systems 42, 44, and 46 operate in the same way as the fluid pressure control system 40 to modulate the fluid pressure supplied to the brakes 28, 32, and 34. The controller 70 sends signals to various combinations of the fluid pressure control systems 40, 42, 44, and 46 to effect operation of the brakes 26, 28, 32, and 34 between disengaged and engaged conditions. In addition, the controller 70 effects operation of the fluid pressure control systems 40–46 to modulate the braking force transmitted through the brakes 26–34 to the winch drum 12.

Brakes

The brakes 26, 28, 32, and 34 are generally similar and have a known construction. Therefore, the construction of only the brake 26 will be described in detail. The brake 26 (FIG. 3) is operable between a disengaged condition in which the brake is ineffective to retard rotation of the drum 22 of the winch 14 and an engaged condition in which the brake is effective to retard rotation of the drum. When the brake 26 is in an engaged condition the brake 26 is effective to transmit force between the drum 22 and a mounting flange 200. When the brake 26 is in the engaged condition, the force transmitted between the drum 22 and mounting flange 200 through the brake can be varied by varying the fluid pressure conducted to the brake. When the brake 26 is in the disengaged condition the brake is ineffective to transmit force between the drum 22 and the mounting flange 200.

The brake 26 includes a cylindrical tubular gear hub or inner member 218 (FIGS. 3 and 4) having an annular array of linear external splines or teeth 220. The straight splines or teeth 220 extend parallel to a central axis of the gear hub 218. The gear hub 218 has an axially extending central opening 222 into which a shaft 223 of the drum 22 extends. The gear hub 218 is keyed to the drum shaft 223 by a key 224 to prevent relative rotation between the hub and the drum 22.

Three annular force transmitting discs 226, 228 and 230 are connected to the gear hub 218. The force transmitting discs 226, 228, and 230 have internal splines 232 (FIG. 4) which slidably engage the splines 220 on the outside of the gear hub 218. The splines 232 on the force transmitting discs 226, 228, and 230 enable the force transmitting discs to be readily moved axially along the gear hub 218 between the disengaged position and an engaged position.

The force transmitting disc 226 has parallel flat annular friction linings 238 and 240 (FIG. 4) attached with screws. The force transmitting disc 228 has parallel flat annular friction linings surfaces 242 and 244. The force transmitting disc 230 has parallel flat annular friction linings 246 and 248. The friction linings 238–248 have flat annular side surfaces disposed in radial planes which extend perpendicular to a central axis 250 of the drum 22 and the hub 218. The force transmitting discs 226, 228, and 230 have central axes which are coincident with the axis 250 (FIG. 3) of the gear hub 218 and the drum 22.

An annular reaction disc 256 (FIGS. 3 and 4) is disposed between the force transmitting discs 226 and 228. An annular reaction disc 258 is disposed between the force transmitting discs 228 and 230. The reaction discs 256 and 258 are disposed in coaxial relationship with the force transmitting discs 226, 228, and 230 and the drum 22.

Figure 3:
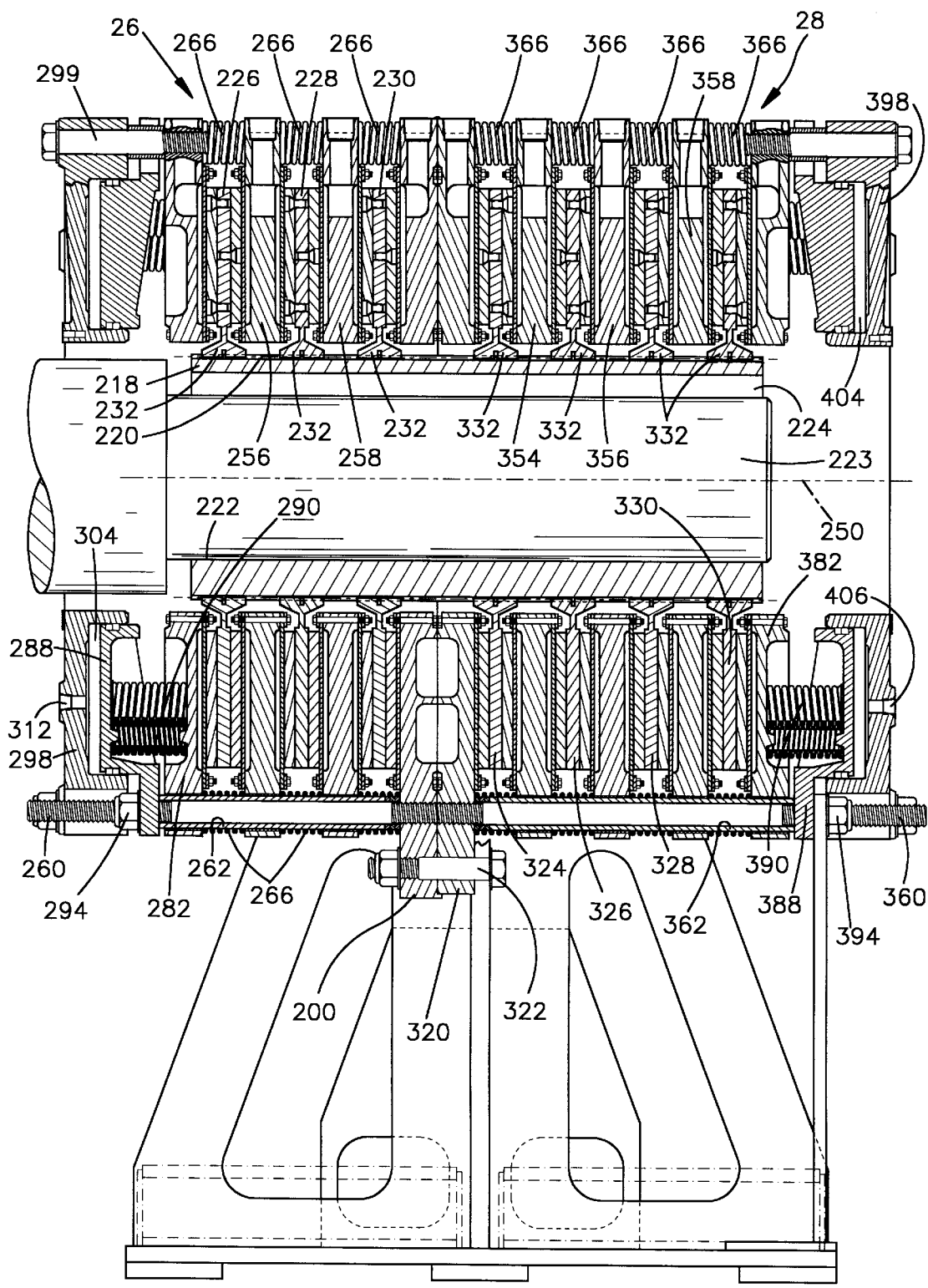
FIG. 3 is a sectional view illustrating the construction of a pair of force transmitting assemblies or brakes which form part of the apparatus of FIG. 1.

The reaction discs 256 and 258 (FIG. 4) are held against rotation relative to the mounting flange 200 by a plurality of relatively long studs 260 (FIG. 3). Although only a single stud 260 has been illustrated in FIG. 3, it should be understood that a plurality of studs 260 are disposed in an annular array about the axis 250. The studs 260 a re enclosed by cylindrical clamp tubes 262.

The clamp tubes 262 extend through circular openings formed in the reaction discs 258. The clamp tubes 262 and the studs 260 have coincident central axes which extend parallel to the axis 250. The reaction discs 256 and 258 are freely slidable axially along the clamp tubes 262. However, the clamp tubes 262 and studs 260 hold the reaction discs 256 and 258 against rotation relative to the base 200.

Reaction springs 266 (FIG. 4) urge the reaction discs 256 and 258 to predetermined positions relative to the clamp tubes 262 and the mounting flange 200. The helical reaction springs 266 extend around and are axially movable along the clamp tubes 262.

Annular wear plates (copper plates) 272 and 274 (FIG. 4) are fixedly secured to the reaction disc 256. The annular wear plates 276 and 278 are fixedly secured to the reaction disc 258. The wear plates 272–278 are preferably made of copper. The wear plates 272 is engageable with the flat annular friction lining 240 on the force transmitting disc 226. The wear plate 274 is engageable with the flat annular friction lining 242 of the force transmitting disc 228. The wear plate 276 on the reaction disc 258 is engageable with the flat annular friction lining 244 on the force transmitting disc 228. The wear plate 278 on the reaction disc 258 is engageable with the flat annular friction lining 246 on the force transmitting disc 230.

An annular pressure plate 282 (FIGS. 3 and 4) has openings through which clamp tubes 262 and studs 260 (FIG. 3) extend. Pressure plate 282 has a central axis which is coincident with the axis 250. The pressure plate 282 is held against rotation by and is freely movable axially relative to the clamp tubes 262 and studs 260.

An annular wear plate 284 (FIG. 4) is fixedly secured to the pressure plate 282. The wear plate 284 is preferably made of copper. The wear plate 284 is engageable with the flat annular friction lining 238 on the force transmitting disc 226.

An annular wear plate 286 is fixedly secured to the mounting flange 200. The wear plate 286 is preferably made of copper. The wear plate 286 is engageable with the flat annular friction lining 248 on the force transmitting disc 230.

An annular spring housing 288 (FIG. 3) encloses a plurality of sets of helical coil springs 290. The spring housing 288 is coaxial with the pressure plate 282 and reaction discs 256 and 258. The spring housing 288 has a plurality of openings through which the studs 260 extend. The clamp tubes 262 cooperate with clamp nuts 294 to hold the spring housing 288 against axial and rotational movement relative to the mounting flange 200. Thus, the mounting flange 200 and the spring housing 288 are fixedly interconnected and cannot move relative to each other during operation of the force transmitting assembly 26.

The helical coil springs 290 (FIG. 4) are disposed between the stationery spring housing 288 and the axially movable pressure plate 282. The springs 290 urge the pressure plate 282 towards the base 200 and urge the force transmitting discs 226, 228, and 230 into engagement with the base 200, reaction discs 256 and 258, and pressure plate 282.

Figure 4:
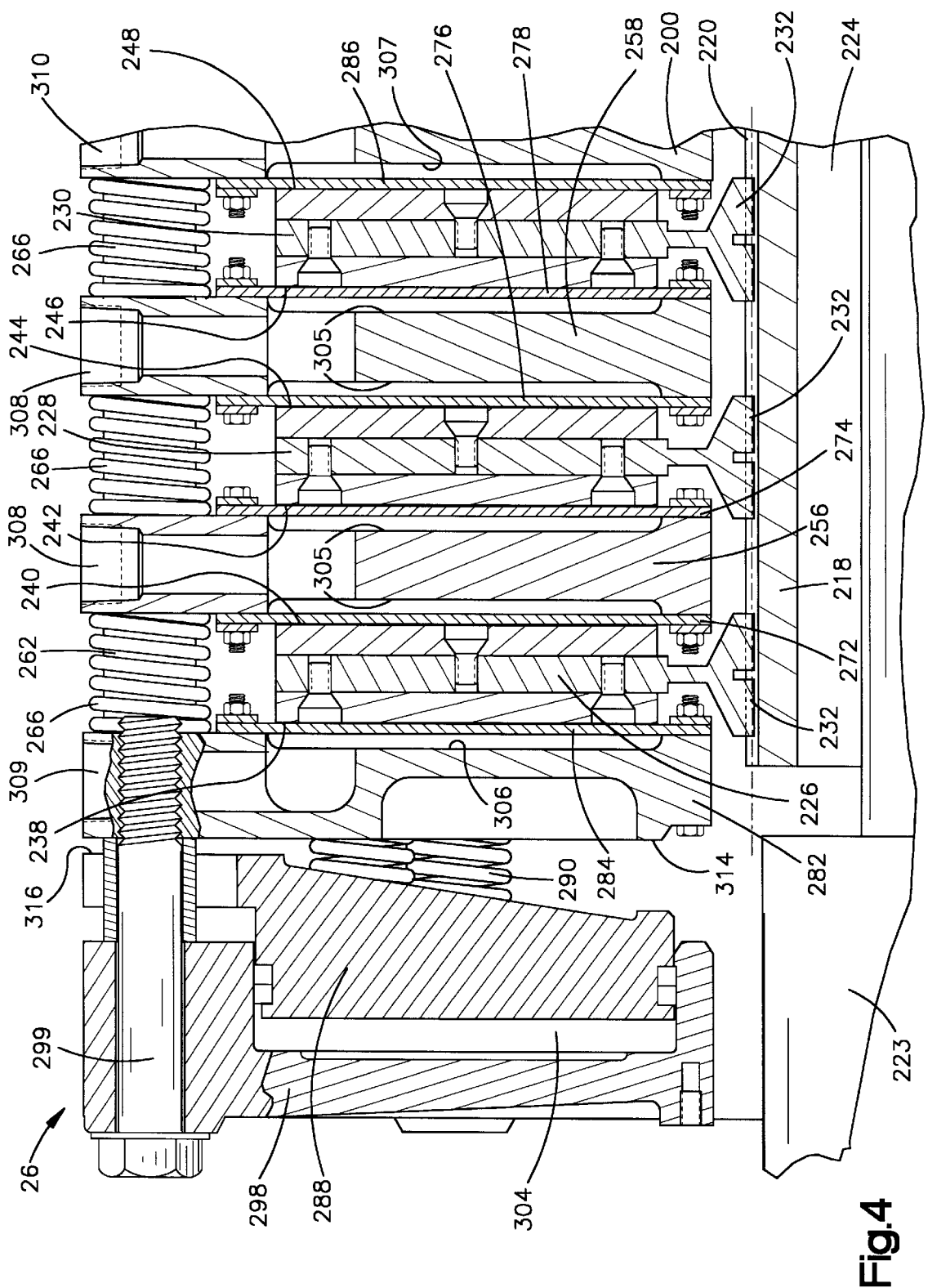
FIG. 4 is an enlarged fragmentary sectional view of a portion of one of the force transmitting assemblies or brakes illustrated in FIG. 3.

An annular cylinder 298 is fixedly connected with the pressure plate 282 by bolts 299 (FIG. 4). The cylinder 298 is coaxial with the spring housing 288 and reaction discs 256 and 258. The cylinder 298 moves axially relative to the studs 260 (FIG. 3) and the clamp tubes 262 with the pressure plate 282. The cylinder 298 and spring housing 288 cooperate to define an annular pressure chamber 304.

The reaction discs 256 and 258 have annular recesses 305 formed in opposite sides of the reaction discs. The annular recesses 305 are covered by the wear plates 272–278. The pressure plate 282 has an annular recess 306 covered by the wear plate 284. The mounting flange 200 has a recess 307 covered by the wear plate 286.

A coolant, such as water, is conducted into the recesses 305, 306, and 307 through passages (not shown) in the reaction discs 256 and 258, the pressure plate 282, and the mounting flange 200. The coolant is conducted out of the recesses 305 through passages 308 (FIG. 4) in the reaction discs 256 and 258. The coolant is conducted out of the recess 306 by a passage 309 in the pressure plate 282. The coolant is conducted out of the recess 307 by a passage 310 in the base 200. The copper wear plates 272, 274, 276, 278, 284, and 286 are cooled by the coolant flowing through the recesses 305, 306, and 307.

When the brake 26 is to be operated to the disengaged condition, high pressure fluid, (air) is conducted into the pressure chamber 304 through a plurality of passages 312 (FIG. 3). The high pressure fluid in the pressure chamber 304 urges the cylinder 298 toward the left (as viewed in FIG. 3). The high pressure fluid (air) in the pressure chamber 304 moves the cylinder 298 toward the left until an annular shoulder 314 (FIG. 4) on the pressure plate 282 moves into abutting engagement with a side surface 316 on the spring housing 288.

When the brake 26 is to be operated from the disengaged condition to an engaged condition, the high pressure fluid (air) is conducted from the chamber 304 through the passages 312 (FIG. 3). The springs 290 move the pressure plate 282 toward the right (as view in FIG. 3). As this occurs, the shoulder 314 on the pressure plate 282 moves away from the side surface 316 on the spring housing 288 causing the force transmitting discs 226, 228, and 230 to engage the reaction discs 256 and 258, the pressure plate 282, and the mounting flange 200.

The retarding force applied by the brake 26 is varied by varying the fluid pressure in the chamber 304. As the fluid pressure in the chamber 304 decreases from a maximum pressure, the amount of force urging the force transmitting discs 226, 228, and 230 into engagement with the reaction discs 256 and 258, the pressure plate 282, and the mounting flange 200 increases. Accordingly, the force applied by the brake 26 to retard rotation of the drum 22 increases as the pressure in the chamber 304 decreases.

The construction and mode of operation of the brake 26 is generally similar to the construction and mode of operation of a force transmitting assembly disclosed in U.S. Pat. No. 5,383,544. However, the force transmitting assembly disclosed in U.S. Pat. No. 5,383,544 has two force transmitting discs while the brake 26 has three force transmitting discs 226, 228 and 230. Of course, the brake 26 could have a different construction if desired. A brake having a construction similar to the brake 26 is commercially available from Eaton Corporation, Airflex Division of Cleveland, Ohio under the designation WCS 336 Water-Cooled Spring Applied Brake.

In the brake 26 there are three force transmitting discs 226, 228, and 230. However, the brake 28 has a greater force transmitting capacity than the brake 26 and there are four force transmitting discs in the brake 28. The brake 28 is substantially similar to the brake 26 and, therefore, will not be described in detail.

The brake 28 (FIG. 3) is operable between a disengaged condition in which the brake is ineffective to retard rotation of the drum 22 of the winch 14 and an engaged condition in which the brake is effective to retard rotation of the drum. When the brake 28 is in the engaged condition, the brake is operable to transmit force between the drum 22 and a base mounting flange 320. When the brake 28 is in the disengaged condition, the brake is ineffective to transmit force between the drum 30 and the mounting flange 320. The mounting flange 320 of the brake 28 is connected to the base mounting flange 200 of the brake 26 by a plurality of bolts 322.

The brake 28 includes four force transmitting discs 324, 326, 328, and 330 connected to the gear hub 218. The force transmitting discs 324, 326, 328, and 330 have internal splines 332 which slidably engage the splines 220 on the outside of the gear hub 218. The splines 332 of the force transmitting discs 324, 326, 328, and 330 enable the force transmitting discs to be readily moved axially along the gear hub 218 between disengaged positions and engaged positions.

Three annular reaction discs 354, 356, and 358 are disposed between the force transmitting discs 324, 326, 328, and 330. The reaction discs 354–358 are disposed in a coaxial relationship with the force transmitting discs 324–330 and the drum 22. The reaction discs 354–358 are held against rotation relative to the mounting flange 320 by a plurality of studs 360. The studs 360 are enclosed by cylindrical clamp tubes 362. The clamp tubes 362 extend through circular openings formed in the reaction discs 354–358. The reaction discs 354–358 are freely slidable axially along the clamp tubes 362. However, the clamp tubes 362 and studs 360 hold the reaction discs 354–358 against rotation relative to the mounting flange 320.

When the force transmitting assembly 28 is in the disengaged condition, reaction springs 366 urge the reaction discs 354–358 to predetermined positions relative to the clamp tubes 362 and the base 320. The helical reaction springs 366 extend around and are axially movable relative to the clamp tubes 362. Annular wear plates are secured to the reaction discs 354, 356, and 358. The wear plates are engageable with flat annular friction linings on the force transmitting discs 324, 326, 328, and 330.

An annular pressure plate 382 has openings through which the clamp tubes 362 and studs 360 extend. The pressure plate 382 is held against rotation by and is freely movable axially relative to the clamp tubes 362 and studs 360. An annular wear plate is fixedly secured to the pressure plate 382 and faces toward and is engageable with a flat annular friction lining on the force transmitting disc 330. An annular wear plate is secured to the base mounting flange 320 and is engageable with a flat annular friction lining on the force transmitting disc 324.

An annular spring housing 388 encloses a plurality of sets of helical coil springs 390. The spring housing 388 has a plurality of openings through which the studs 360 extend. The clamp tubes 362 cooperate with clamp nuts 394 to hold the spring housing 388 against axial and rotational movement relative to the base 320. Thus, the base 320 and spring housing 388 are fixedly interconnected and cannot move relative to each other during operation of the brake 28.

The helical coil springs 390 are disposed between the stationary spring housing 388 and the axially movable pressure plate 382. The springs 390 urge the pressure plate 382 toward the base mounting flange 320 to clamp the force transmitting discs 324, 326, 328, and 330 between the base 320, the reaction discs 354, 356, and 358, and pressure plate 382 when the brake 28 is in an engaged condition.

An annular cylinder 398 is fixedly connected with the pressure plate 382. The cylinder 398 moves axially relative to the studs 360 and the clamp tubes 362 with the pressure plate 382. The cylinder 398 forms an annular pressure chamber 404 between the axially movable cylinder 398 and the stationary spring housing 388. The brake 28 includes recesses behind the friction linings and passages for conducting coolant, such as water, through the brake to cool the friction linings.

The construction and mode of operation of the brake 28 is generally similar to the construction and mode of operation of a force transmitting assembly disclosed in U.S. Pat. No. 5,383,544. However, the force transmitting assembly disclosed in U.S. Pat. No. 5,383,544 has two force transmitting discs while the brake 28 has four force transmitting discs 324, 326, 328 and 330. Of course, the brake 28 could have a different construction if desired. A brake having a construction similar to the brake 28 is commercially available from Eaton Corporation, Airflex Division of Cleveland, Ohio under the designation WCS 436 Water-Cooled Spring Applied Brake.

When the brake 28 is to be operated to the disengaged condition, high pressure fluid (air) is conducted into the pressure chamber 404 through a plurality of passages 406. The high pressure fluid in the pressure chamber 404 urges the cylinder 398 toward the right (as viewed in FIG. 3). The high pressure fluid (air) in the pressure chamber 304 moves the cylinder 398 toward the right until the pressure plate 382 moves into abutting engagement with an annular side surface on the spring housing 388.

When the force transmitting assembly 28 is to be operated from the disengaged condition to an engaged condition, the high pressure fluid (air) is conducted from the chamber 404 through the passages 406. The springs 390 move the pressure plate 382 toward the left (as viewed in FIG. 3). As this occurs, the pressure plate 382 moves away from the spring housing 388 causing the force transmitting discs 324, 326, 328, and 330 to engage the reaction discs 354, 356, and 358, the pressure plate 382, and the base mounting flange 320.

Each of the fluid pressure control systems 40 and 42 (FIG. 1) for the brakes 26 and 28 has the same range of control fluid pressure. Since this range of control fluid pressure is utilized to actuate both the brake 26 and the brake 28, an incremental change in the control fluid pressure to either one of the brakes 26 or 28 effects a relatively small change in the braking force transmitted to the winch drum 22. However, if the two brakes 26 and 28 were replaced by a single relatively large brake, the same incremental change in the control fluid pressure would result in approximately twice as large a change in the braking force transmitted to the winch drum 22.

The brakes 32 and 34 are substantially similar to the brakes 26 and 28. The brake 32 has three force transmitting discs and the brake 34 has four force transmitting discs. The brakes 32 and 34 have bases that are bolted together and are connected with the drum 22 in the same manner as described in connection with the brakes 26 and 28.

The brakes 26–34 are all of the spring applied type in which fluid pressure is utilized to maintain the brakes in a disengaged condition against the influence of springs 290 and 390 (FIG. 3). However, the brakes 26–34 could be of the type in which fluid pressure is utilized to engage the brakes.

Operation

The controller 70 (FIG. 1) sends signals to various combinations of the fluid pressure control systems 40, 42, 44, and 46 to effect operation of the brakes 26, 28, 32, and 34 between disengaged and engaged conditions. The controller 70 controls the brakes 26, 28, 32, and 34 to retard rotation of the drum 22 as a function of the load on the draw string 12 and the speed of rotation of the drum 22. As the load on the draw string 12 or the speed of rotation of the drum 22 increases, the controller 70 effects operation of various combinations of the brakes 26, 28, 32, and 34 to engaged conditions to increase the force retarding rotation of the drum.

When the load on the draw string is relatively small or the speed of rotation of the drum 22 is relatively slow, the controller 70 sends a signal to the fluid pressure control system 40 to effect operation of the brake 26 to an engaged condition. The controller 70 also sends signals to the fluid pressure control systems 42, 44, and 46 to effect operation of the brakes 28, 32, and 34 to disengaged conditions. As the load of the draw string increases or the speed of rotation of the drum 22 increases, the controller 70 operates the fluid pressure control system 40 to reduce the amount of fluid pressure supplied to the brake 26. Accordingly, the force applied by the brake 26 to retard rotation of the drum 22 increases. When the load of the draw string 12 is relatively small or the speed of rotation of the drum 22 is relatively slow, a substantial change in fluid pressure supplied to the brake 26 is required to enable springs 290 in the brake to effect a substantial change in the force retarding rotation of the drum.

When the load on the draw string 12 or the speed of rotation of the drum 22 increases above a point where the brake 26 can not sufficiently retard rotation of the drum, the controller 70 operates the fluid pressure control system 42 to decrease the fluid pressure applied to the brake 28 and therefore effect operation of the brake 28 to an engaged condition. Accordingly, the force applied by the brake 28 to retard rotation of the drum 22 increases. Therefore, seven force transmitting discs are used to retard rotation of the drum 22. The controller 70 operates the pressure control systems 40 and 42 to continue decreasing the fluid pressure supplied to the brakes 26 and 28 as the load on the draw string 12 continues to increase.

When the load of the draw string 12 increases or the speed of rotation of the drum 22 increases to a point where the brakes 26 and 28 can not sufficiently retard rotation of the drum 22, the controller 70 operates the fluid pressure control system 44 to effect operation of the brake 32 to an engaged condition. Accordingly, ten force transmitting discs retard rotation of the drum 22. While the load on the draw string 12 continues to increase, the controller 70 operates the fluid pressure control systems 40–44 to continue decreasing the fluid pressure applied to the brakes 26, 28, and 32.

When the load on the draw string 12 or the speed of rotation of the drum 22 increases to a point where the brakes 26, 28, and 32 can not sufficiently retard rotation of the drum, the controller 70 operates the fluid pressure control system 46 to effect operation of the brake 34 to an engaged condition. Accordingly, fourteen force transmitting discs retard rotation of the drum 22. The controller 70 operates the fluid pressure control systems 40–46 to decrease the fluid pressure supplied to the brakes 26–34 as the load on the draw string 12 continues to increase.

It is contemplated that the controller 70 could effect operation of various combinations of the brakes 26, 28, 32, and 34 to the engaged conditions and therefore, vary the number of force transmitting discs retarding rotation of the drum 22. The controller 70 can vary the fluid pressure supplied to the brakes 26, 28, 32, and 34 to vary the amount of force applied by each of the brakes to retard rotation of the drum 22.

For example, the controller 70 could effect operation of the brake 28 to an engaged condition and the brakes 26, 32, and 34 to disengaged conditions as the load on the draw string 12 increases to a point where the brake 26 cannot sufficiently retard rotation of the drum 22. Therefore, four force transmitting discs would retard rotation of the drum.

When the load on the draw string 12 increases to a point where the brake 28 cannot sufficiently retard rotation of the drum 22, the controller can effect operation of brakes 26 and 32 to engaged conditions and the brakes 28 and 34 to disengaged conditions. Therefore, six force transmitting discs would retard rotation of the drum 22.

When the load on the draw string increases to a point where the brakes 26 and 32 cannot sufficiently retard rotation of the drum 22, the controller can effect operation of brakes 26 and 28 to engaged conditions and the brakes 32 and 26 to disengaged conditions. Therefore, seven force transmitting discs would retard rotation of the drum 22.

When the load on the draw string increases to a point where the brakes 26 and 28 cannot sufficiently retard rotation of the drum 22, the controller can effect operation of brakes 28 and 34 to engaged conditions and the brakes 32 and 34 to disengaged conditions. Therefore, eight force transmitting discs would retard rotation of the drum 22.

When the load on the draw string increases to a point where the brakes 28 and 34 cannot sufficiently retard rotation of the drum 22, the controller can effect operation of brakes 26, 28 and 32 to engaged conditions and the brake 34 to a disengaged condition. Therefore, ten force transmitting discs would retard rotation of the drum 22.

When the load on the draw string increases to a point where the brakes 26, 28 and 32 cannot sufficiently retard rotation of the drum 22, the controller can effect operation of brakes 26, 28 and 34 to engaged conditions and the brake 32 to a disengaged condition. Therefore, eleven force transmitting discs would retard rotation of the drum 22.

When the load on the draw string increases to a point where the brakes 26, 28 and 34 cannot sufficiently retard rotation of the drum 22, the controller can effect operation of all the brakes 26, 28, 32 and 34 to engaged conditions.

Therefore, fourteen force transmitting discs would retard rotation of the drum 22.

Although, brakes 26 and 32 are shown as having three force transmitting discs and brakes 28 and 34 are shown as having four transmitting discs, each of the brakes 26, 28, 32, and 34 may have any desired number of force transmitting discs.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:
   a first member;
   a second member;
   a first force transmitting assembly operable between an engaged condition in which said first force transmitting assembly is effective to transmit force between said first and second members and a disengaged condition in which said first force transmitting assembly is ineffective to transmit force between said first and second members;
   a second force transmitting assembly operable between an engaged condition in which said second force transmitting assembly is effective to transmit force between said first and second members and a disengaged condition in which said second force transmitting assembly is ineffective to transmit force between said first and second members; and
   control means for operating said first and second force transmitting assemblies between the disengaged and engaged conditions as a function of a load applied to one of said first and second members,
   said first force transmitting assembly being capable of transmitting loads which are less than a first magnitude, said second force transmitting assembly being capable of transmitting loads which are less than a second magnitude which is larger than the first magnitude, said control means including means for effecting operation of said first force transmitting assembly to the disengaged condition and said second force transmitting assembly to the engaged condition as the load increases from a magnitude greater than the first magnitude to a magnitude which is less than the second magnitude.

2. An apparatus as set forth in claim 1 wherein said control means includes means for effecting operation of said first force transmitting assembly from the disengaged condition to the engaged condition while said second force transmitting assembly remains in the engaged condition in response to the load increasing from a magnitude greater that the second magnitude.

3. An apparatus as set forth in claim 1 wherein said first force transmitting assembly includes:
   a first force transmitting disc connected with and movable relative to said first member;
   a second force transmitting disc connected with and movable relative to said first member;
   a first reaction disc connected with and movable relative to said second member and disposed between said first and second force transmitting discs;
   said first and second force transmitting discs having side surfaces which are disposed in engagement with opposite surfaces of said first reaction disc when said first force transmitting assembly is in the engaged condition, said side surfaces of said first and second force transmitting discs being spaced from said opposite surfaces of said first reaction disc when said first force transmitting assembly is in the disengaged condition;
   first means for moving said side surfaces of said first and second force transmitting discs into engagement with said opposite surfaces of said first reaction disc upon operation of said first force transmitting assembly from the disengaged condition to the engaged condition; and
   wherein said second force transmitting assembly includes:
   a third force transmitting disc connected with and movable relative to said first member;
   a fourth force transmitting disc connected with and movable relative to said first member;
   a second reaction disc connected with and movable relative to said second member and disposed between said third and fourth force transmitting discs;
   said third and fourth force transmitting discs having side surfaces which are disposed in engagement with opposite surfaces of said second reaction disc when said second force transmitting assembly is in the engaged condition, said side surfaces of said third and fourth force transmitting discs being spaced from said opposite surfaces of said second reaction disc when said second force transmitting assembly is in the disengaged condition;
   second means for moving said side surfaces of said third and fourth force transmitting discs into engagement with said opposite surfaces of said second reaction disc upon operation of said second force transmitting assembly from the disengaged condition to the engaged condition.

4. An apparatus as set forth in claim 3 wherein said control means includes means for effecting operation of said first means for moving said side surfaces of said first and second force transmitting discs while said second means for moving said side surfaces of said third and fourth force transmitting discs is ineffective to move said side surfaces of said third and fourth force transmitting discs.

5. An apparatus as set forth in claim 1 wherein said first member is a rotatable drum, said first and second force transmitting assemblies being connected to said drum adjacent a first end portion of said drum.

6. An apparatus as set forth in claim 1 wherein said first member is a rotatable drum, said first force transmitting assembly being connected to said drum adjacent a first end portion of said drum and said second force transmitting assembly being connected to said drum adjacent a second end portion of said drum.

7. An apparatus as set forth in claim 1 wherein said first member is a rotatable drum connected with a cable, said first and second force transmitting assemblies being connected with said drum, said first force transmitting assembly being effective to retard rotation of said drum when said first force transmitting assembly is in the engaged condition, said first force transmitting assembly being ineffective to retard rotation of said drum when said first force transmitting assembly is in the disengaged condition, said second force transmitting assembly being effective to retard rotation of said drum when said second force transmitting assembly is in the engaged condition, said second force transmitting assembly being ineffective to retard rotation of said drum when said second force transmitting assembly is in the disengaged condition, said control means includes first sensor means for providing a first signal which varies as a function of variations in a load applied to said cable.

8. An apparatus as et forth in claim 7 wherein said first force transmitting assembly is connected to a first axial end of said drum and said second force transmitting assembly is connected to a second axial end of said drum.

9. An apparatus as set forth in claim 7 further including a third force transmitting assembly connected with said drum and a fourth force transmitting assembly connected with said drum, said third force transmitting assembly being operable between an engaged condition in which said third force transmitting assembly retards rotation of said drum and a disengaged condition in which said third force transmitting assembly is ineffective to retard rotation of said drum, said fourth force transmitting assembly being operable between an engaged condition in which said fourth force transmitting assembly is effective to retard rotation of said drum and a disengaged condition in which said fourth force transmitting assembly is ineffective to retard rotation of said drum.

10. An apparatus as set forth in claim 9 wherein said control means includes means for effecting operation of said third force transmitting assembly to the engaged condition as the load increases with said first and second force transmitting assemblies in the engaged condition and with said fourth force transmitting assembly in the disengaged condition.

11. An apparatus as set fort in claim 9 wherein said control means includes means for effecting operation of said first, second, third, and fourth force transmitting assemblies to the engaged condition.

12. An apparatus comprising a drum having a central axis about which said drum is rotatable, a first force transmitting assembly connected with a first end portion of said drum, said first force transmitting assembly includes a first plurality of annular force transmitting discs disposed in a coaxial relationship with said drum and rotatable with said drum, a first plurality of annular reaction discs disposed in a coaxial relationship with said drum and held against rotation with said drum, said first plurality of reaction discs being disposed in a side-by-side relationship with said first plurality of force transmitting discs, and a first annular actuator disposed in a coaxial relationship with said drum and connected with said first plurality of annular reaction discs, said first actuator being operable between first and second conditions to effect operation of said first force transmitting assembly between an engaged condition and a disengaged condition, said first plurality of force transmitting discs and said first plurality of reaction discs being pressed together by said first actuator when said first force transmitting assembly is in the engaged condition, said first actuator being ineffective to press said first plurality of force transmitting discs and said first plurality of reaction discs together when said first force transmitting assembly is in the disengaged condition, a second force transmitting assembly connected with the first end portion of said drum, said second force transmitting assembly includes a second plurality of annular force transmitting discs disposed in a coaxial relationship with said drum and rotatable with said drum, a second plurality of annular reaction discs disposed in a coaxial relationship with said drum and held against rotation with said drum, said second plurality of reaction discs being disposed in a side-by-side relationship with said second plurality of force transmitting discs, and a second annular actuator disposed in a coaxial relationship with said drum and connected with said second plurality of annular reaction discs, said second actuator being operable between first and second conditions to effect operation of said second force transmitting assembly between an engaged condition and a disengaged condition, said second plurality of force transmitting discs and said second plurality of reaction discs being pressed together by said second actuator when said second force transmitting assembly is in the engaged condition, said second actuator being ineffective to press said second plurality of force transmitting discs and said second plurality of reaction discs together when said second force transmitting assembly is in the disengaged condition, a third force transmitting assembly connected with a second end portion of said drum disposed axially opposite from said first end portion of said drum, said third force transmitting assembly includes a third plurality of annular force transmitting discs disposed in a coaxial relationship with said drum and rotatable with said drum, a third plurality of annular reaction discs disposed in a coaxial relationship with said drum and held against rotation with said drum, said third plurality of reaction discs being disposed in a side-by-side relationship with said third plurality of force transmitting discs, and a third annular actuator disposed in a coaxial relationship with said drum and connected with said third plurality of annular reaction discs, said third actuator being operable between first and second conditions to effect operation of said third force transmitting assembly between an engaged condition and a disengaged condition, said third plurality of force transmitting discs and said third plurality of reaction discs being pressed together by said third actuator when said third force transmitting assembly is in the engaged condition, said third actuator being ineffective to press said third plurality of force transmitting discs and said third plurality of reaction discs together when said third force transmitting assembly is in the disengaged condition, a fourth force transmitting assembly connected with the second end portion of said drum, said fourth force transmitting assembly includes a fourth plurality of annular force transmitting discs disposed in a coaxial relationship with said drum and rotatable with said drum, a fourth plurality of annular reaction discs disposed in a coaxial relationship with said drum and held against rotation with said drum, said fourth plurality of reaction discs being disposed in a side-by-side relationship with said fourth plurality of force transmitting discs, and a fourth annular actuator disposed in a coaxial relationship with said drum and connected with said fourth plurality of annular reaction discs, said fourth actuator being operable between first and second conditions to effect operation of said fourth force transmitting assembly between an engaged condition and a disengaged condition, said fourth plurality of force transmitting discs and said fourth plurality of reaction discs being pressed together by said fourth actuator when said fourth force transmitting assembly is in the engaged condition, said fourth actuator being ineffective to press said fourth plurality of force transmitting discs and said fourth plurality of reaction discs together when said fourth force transmitting assembly is in the disengaged condition, and a control apparatus connected with said first, second, third and fourth actuators, said control apparatus being operable to effect sequential operation of said first, second, third and fourth force transmitting assemblies between the engaged and disengaged conditions.

13. An apparatus as set forth in claim 12 further including first connector means for fixedly connecting an end portion of said first force transmitting assembly to an end portion of said second force transmitting assembly, and second connector means for fixedly connecting an end portion of said third force transmitting assembly to an end portion of said fourth force transmitting assembly.

14. An apparatus as set forth in claim 12 wherein said control apparatus is operable to effect operation of said force transmitting assemblies to a condition in which two of said force transmitting assemblies are in the engaged condition and two of said force transmitting assemblies are in the disengaged condition.

15. An apparatus as set forth in claim 12 wherein said first and third pluralities of force transmitting discs each include the same number of force transmitting discs, said second and fourth pluralities of force transmitting discs each include a number of force transmitting discs which is greater than the number of force transmitting discs in said first and third pluralities of force transmitting discs.

16. An apparatus comprising a rotatable member having a central axis about which said rotatable member is rotatable, a first force transmitting assembly connected with said rotatable member, said first force transmitting assembly includes a first plurality of annular force transmitting discs disposed in a coaxial relationship with said rotatable member and rotatable with said rotatable member, a first plurality of annular reaction discs disposed in a coaxial relationship with said rotatable member and held against rotation with said rotatable member, said first plurality of reaction discs being disposed in a side-by-side relationship with said first plurality of force transmitting discs, and a first annular fluid pressure activated actuator disposed in a coaxial relationship with said rotatable member and connected with said first plurality of annular reaction discs, said first actuator being operable between first and second conditions to effect operation of said first force transmitting assembly between an engaged condition and a disengaged condition, said first plurality of force transmitting discs and said first plurality of reactions discs being pressed together by said first actuator when said first force transmitting assembly is in the engaged condition, said first actuator being ineffective to press said first plurality of force transmitting discs and said first plurality of reaction discs together when said first force transmitting assembly is in the disengaged condition, a second force transmitting assembly connected with said rotatable member, said second force transmitting assembly being fixedly connected with said first force transmitting assembly, said second force transmitting assembly includes a second plurality of annular force transmitting discs disposed in a coaxial relationship with said rotatable member and rotatable with said rotatable member, a second plurality of annular reaction discs disposed in a coaxial relationship with said rotatable member and held against rotation with said rotatable member, said second plurality of reaction discs being disposed in a side-by-side relationship with said first plurality of force transmitting discs, and a second annular fluid pressure activated actuator disposed in a coaxial relationship with said rotatable member and connected with said second plurality of annular reaction discs, said second actuator being operable between first and second conditions to effect operation of said second force transmitting assembly between an engaged condition and a disengaged condition, said second plurality of force transmitting discs and said second plurality of reaction discs being pressed together by said second actuator when said second force transmitting assembly is in the engaged condition, said second actuator being ineffective to press said second plurality of force transmitting discs and said second plurality of reaction discs together when said second force transmitting assembly is in the disengaged condition, and a control apparatus connected with said first and second actuators, said control apparatus being operable to vary fluid pressure conducted to said first actuator as a function of variations in a load applied to said rotatable member while maintaining a fluid pressure conducted to said second actuator substantially constant, said control apparatus being operable to vary fluid pressure conducted to said second actuator as a function of variations in a load applied to said rotatable member while maintaining a fluid pressure conducted to said first actuator substantially constant.

17. An apparatus as set forth in claim 16 wherein said second plurality of force transmitting discs contains a greater number of force transmitting discs than said first plurality of force transmitting discs.

18. An apparatus as set forth in claim 16 wherein said force transmitting assemblies includes a single hub member which extends between said first and second force transmitting assemblies and is connected to said rotatable member for rotation with said rotatable member, said first and second pluralities of force transmitting discs being connected with said hub member.

19. An apparatus as set forth in claim 16 wherein said first force transmitting assembly includes first and second end portions disposed at axially opposite ends of said first force transmitting assembly, said first actuator being connected with said first end portion of said first force transmitting assembly, said second end portion of said first force transmitting assembly being disposed in engagement with said second force transmitting assembly.

* * * * *